United States Patent [19]

Besnard et al.

[11] Patent Number: 5,290,350
[45] Date of Patent: Mar. 1, 1994

[54] INSULATING SHAPED ARTICLES COMPRISING INORGANIC FIBROUS MATRICES AND XANTHAN GUM/CATIONIC STARCH BINDERS

[75] Inventors: Marie-Madeleine Besnard, Anthony; Fabrice Brenner, Wissembourg; Magali Knipper, Paris, all of France

[73] Assignee: Rhone-Poulenc Chimie, Courbevoie, France

[21] Appl. No.: 794,902

[22] Filed: Nov. 20, 1991

[30] Foreign Application Priority Data

Nov. 28, 1990 [FR] France ................... 90 14852

[51] Int. Cl.$^5$ .................................... C09D 4/00
[52] U.S. Cl. ................... 106/214; 252/62; 106/209
[58] Field of Search ............ 106/209, 214; 252/62; 524/55, 401, 494, 12, 443, 447, 451

[56] References Cited

U.S. PATENT DOCUMENTS

| | | | |
|---|---|---|---|
| 1,769,519 | 7/1930 | King et al. | 428/141 |
| 1,996,032 | 3/1935 | Rees | 106/36 |
| 1,996,033 | 3/1935 | King et al. | 106/36 |
| 3,244,632 | 4/1966 | Schulz et al. | 106/214 |
| 3,300,372 | 1/1967 | Bauer | 162/145 |
| 4,190,492 | 2/1980 | Eckert et al. | 162/145 |
| 5,071,511 | 12/1991 | Pittman | 252/62 |

FOREIGN PATENT DOCUMENTS 1087080 10/1980 Canada .
0020096 12/1980 European Pat. Off. .
0083960 7/1983 European Pat. Off. .

OTHER PUBLICATIONS

Chemical Abstracts, vol. 100, No. 10, "Inorganic fiber boards".
R. L. Whistler and J. N. Bemiller: *Industrial Gums*, 1973, Academic Press, London, G.B., pp. 486-497.
World Patents Index Latest, Accession No. 83-837048, Week 49, Derwent Publications Ltd., London, G.B.

*Primary Examiner*—Paul R. Michl
*Assistant Examiner*—LaVonda DeWitt
*Attorney, Agent, or Firm*—Burns, Doane, Swecker & Mathis

[57] ABSTRACT

Physically/mechanically improved insulating shaped articles such as panels or plates, adapted to withstand very elevated temperatures, comprise an inorganic fiber matrix, e.g., a matrix of ceramic fibers, such inorganic fiber matrix containing at least one inorganic filler material, e.g., a mineral wool and/or kaolin, and a consolidating of a binder therefor which comprises admixture of a xanthan gum and a cationic starch.

23 Claims, No Drawings

INSULATING SHAPED ARTICLES COMPRISING INORGANIC FIBROUS MATRICES AND XANTHAN GUM/CATIONIC STARCH BINDERS

BACKGROUND OF THE INVENTION

1. Field of the invention

The present invention relates to insulating shaped articles based on inorganic fibers, especially plates, panels or molded articles, and to a process for the production of such shaped articles.

2. Description of the Prior Art

Shaped articles based on mineral or inorganic fibers are useful insulating materials which can withstand very high temperatures, for example as fireprotection panels, and as refractory insulating plates in thermal furnaces and combustion chambers.

The insulating shaped articles based on ceramic fibers or mineral wools are known products. In general, their preparation requires the use of an organic binder such as starch, polyvinyl alcohol or polyvinyl acetate. The binder content varies depending on the nature of the inorganic material, but generally ranges from 7% to 15% relative to the total amount of solids. Such amount of organic material presents several disadvantages, not only from an economic point of view but also from a technical standpoint. Indeed, when such insulating articles are subsequently subjected to high temperatures, they release large amounts of fumes resulting from the calcination of the organic materials. The destruction of the organic species during calcination causes a deterioration in the mechanical properties of the material. This is the more pronounced, the higher the content of the organic species.

Furthermore, such insulating shaped articles are generally prepared from an aqueous slurry from which the water is removed, for example by draining. With the organic binders heretofore employed in this art, the water removed still contains high concentrations of organic materials, thus reducing the content of the latter in the finished article. Furthermore, if this water is recycled, it is then necessary to readjust the binder content for subsequent manufacturing steps, while if the water is discharged into streams it creates pollution problems.

SUMMARY OF THE INVENTION

Accordingly, a major object of this invention is the provision of improved insulating shaped articles based on inorganic fibers, especially plates, panels and molded articles, which exhibit reduced fume emission when subjected to high temperatures.

Another object of the present invention is the provision of a process for the production of such improved shaped articles based on inorganic fibers which enables reducing the proportion of organic binders required for consolidation thereof, provides only pure wastewater and which enhances the physical and mechanical properties of the final product shaped articles.

Yet another object of this invention is the provision of novel baked insulating shaped articles.

Briefly, the present invention features insulating shaped articles comprising an inorganic fiber matrix, said inorganic fiber matrix including at least one inorganic filler material and a binder therefor which comprises admixture of a xanthan gum and a cationic starch.

DETAILED DESCRIPTION OF THE PREFERRED EMBODIMENTS OF THE INVENTION

More particularly according to the present invention, by the term "fibers" are intended independent filaments or fibrils of varying length and diameter, as well as bundles or tufts of such filaments or fibrils. The fibers advantageously have a length of 0.1 to 50 mm, preferably of 0.1 to 15 mm, and a mean diameter of 1 to 100 microns, preferably of 1 to 10 microns. Exemplary such inorganic fibers include high performance reinforcing fibers, e.g., boron fibers, carbon fibers, glass fibers, ceramic fibers such as fibers of alumina, silica-alumina and silica-alumina modified by other oxides such as the oxides of chromium, boron, zirconium, calcium and magnesium, fibers of titanium dioxide, of silicon carbide, of silicon nitride, of silicon carbonitride or of boron nitride, as well as inorganic wools such as diabase wool, rock wool, slag wool and basalt wool. All of these fibers can be used either alone or in admixture.

Exemplary pulverulent inorganic filler materials suitable for the production of insulating panels include the silicas, in particular the colloidal silicas, the aluminas, the aluminum silicates, kaolin, bentonite, wollastonite, magnesia, calcium carbonate, talc, zirconium oxide and, in general, any inorganic compound used to manufacture insulating and/or refractory articles. These various fillers can be combined with lightweight fillers such as expanded perlite, exfoliated vermiculite and others. The inorganic fillers which improve the flocculation of the binder, such as bentonite and the colloidal silicas, are preferred.

The cationic starches are known materials which are commercially available. They can be prepared by chemical modification of the natural starches by means of compounds bearing tertiary or quaternary amine groups.

Xanthan gum is a commercially available polysaccharide obtained by fermentation of a carbon source by means of a microorganism such as those belonging to the genus Xanthomonas, and more especially the species *Xanthomonas begonias, Xanthomonas campestris, Xanthomonas carotae, Xanthomonas hedera, Xanthomonas incanae, Xanthomonas malvacearum, Xanthomonas papaveri cola, Xanthomonas phaseoli, Xanthomonas pisi Xanthomonas vasculorum, Xanthomonas vericatoria, Xanthomonas vitians and Xanthomonas perlargonlii.*

The term "xanthan gum" includes the treated and modified derivatives such as desacetylated xanthan gum, depyruvatized xanthan gum and the xanthan gum-glyoxal complexes.

The composite n by weight of the insulating shaped article depends on the desired physical and mechanical properties. Thermal insulating plates and panels in general contain from 30% to 90%, preferably from 40% to 85%, by weight of inorganic fibers and from 5% to 60%, preferably from 10% to 50%, of inorganic filler material. In a preferred embodiment of the invention, the binder is present in the shaped article in an amount of from 2% to 10% by weight, advantageously from 3% to 6%. The weight ratio of xanthan gum/cationic starch advantageously ranges from ½ to 1/10 and preferably from ¼ to ⅛.

The insulating shaped articles according to the invention can also contain small amounts of at least one flocculant additive such as synthetic anionic polymers, ammonia or quaternary ammonium compounds.

Exemplary of the synthetic anionic polymers, particularly representative are polyacrylic and polymethacrylic acids.

Exemplary of the quaternary ammonium compounds, particularly representative are the n-alkyltrimethylammonium, n-dialkyldimethylammonium, n-alkyldimethylbenzylammonium and n-alkylpyridinium salts, in which the alkyl radical has from 1 to 30, preferably from 8 to 24, carbon atoms.

In general, the insulating shaped articles contain from 1% to 2% by weight of the said flocculant additive relative to the weight of the binder.

The present invention also features a process for the preparation of the above insulating shaped articles, comprising:

(a) intimately admixing inorganic fibers, at least one inorganic filler material, a binder which comprises a mixture of a xanthan gum and a cationic starch and, optionally, at least one flocculant additive such as a synthetic anionic polymer, ammonia and/or quaternary ammonium compound, with water, such as to form a slurry thereof, (b) shaping said slurry, and (c) drying the shaped slurry.

Advantageously, stage (a), namely, the formation of the slurry, is carried out by dispersing the inorganic fibers in water; thereafter, the inorganic filler, the xanthan gum and, finally, the cationic starch and, where desired, the flocculant additive, are successively added to this dispersion. Preferably, the xanthan gum and the starch are introduced, in solution, in a fraction of the water used to formulate the slurry.

Typically, the procedure followed is such that the solids content of the slurry ranges from 1% to 10% by weight, preferably 4% to 6% by weight, relative to the total weight of the slurry.

The concentration of the mixture of xanthan gum and starch in this slurry advantageously ranges from 0.02% to 1% by weight, preferably from 0.3% to 0.06% by weight, relative to the total weight of slurry.

Stage (b), namely, shaping of the slurry, can be carried out, for example, by casting, molding, calendaring and/or pressing. It can be advantageous, before the shaping operation, to drain the slurry such as to provide a partially dewatered pulp.

Drying can be carried out at a temperature ranging from ambient temperature, namely, about 18° C., to 250° C. Preferably, the drying is carried out at a temperature ranging from 100° to 180° C. Typically, the drying is carried out in such fashion as to provide a residual moisture content of less than 2%, preferably less than 1%.

The present invention also features a baked insulating shaped article that is produced by baking an insulating shaped article as described above. The baking temperature depends on the mineral or inorganic materials constituting said article. Such temperature advantageously ranges from 300° C. to 1,600° C., typically from 500° C. to 1,400° C.

In order to further illustrate the present invention and the advantages thereof, the following specific examples are given, it being understood that same are intended only as illustrative and in nowise limitative.

EXAMPLE 1

The following composition (in % by weight) was employed for the manufacture of an insulating panel:

| | |
|---|---|
| Alumina-silica ceramic fibers | 78.3 |
| Kaolin (35% $Al_2O_3$) | 17.0 |
| Cationic starch | 4.0 |
| Xanthan gum | 0.7 |
| | 100 |

Panels based on inorganic fibers consolidated into a coherent structure were produced using a fibrous material comprising alumina-silica ceramic fibers to which the kaolin and a starch-xanthan gum binder mixture were added.

The fibers were introduced into the water, followed by the xanthan gum in the form of an aqueous solution in which the kaolin was dispersed.

The mixture was stirred for 10 minutes, and thereafter stirring was diminished before adding the starch. The starch was introduced into the mixture in the form of a 5% strength by weight aqueous starch solution. This latter solution was prepared by adding starch powder to boiling water such as to achieve gelatinization of the starch.

The suspension thus obtained was poured into a mold whose base was a screen of perforated plastic. After natural draining, a layer of material was formed on the surface of the screen. The moist material was then subjected to suction such as to attain the desired thickness. The product still contained 60% to 65% of water. It was withdrawn from the mold and then placed in an oven.

Drying in the oven was carried out at a temperature of 180° C. with circulating hot air for 2 hours. The drying operation can be continued for 10–12 hours at 120° C., until a moisture content of less than 1% is attained. The dried product can, after cooling, be subjected to any finishing operation, the nature of which depends on the intended final applications.

The article obtained from the composition given above exhibited the following properties, determined on a panel of 20 mm thickness:

| | |
|---|---|
| Density | 290 kg/m$^3$ |
| Flexural breaking modulus at 20° C. and 50% relative humidity (RH) | 15 kg/cm$^3$ |
| Compressive strength for 10% compression (20° C., 50% RH) | 3 kg/cm$^3$ |
| | 3% |
| Ignition weight loss, after 5 hours baking at 1,000° C. | 5% |
| Linear shrinkage in a block after 24 hours at 1,260° C. | 3% |
| Thermal conductivity at 1,000° C. (ASTM C-201) | 0.20 W/M. °K. |

EXAMPLE 2

A panel was produced according to the procedure of Example 1, but from the following composition:

| | |
|---|---|
| Alumina-silica ceramic fibers | 22.5 |
| Mineral wool (of the Lapinus Rockwool type) | 59.3 |
| Kaolin (35% $Al_2O_3$) | 13.5 |
| Cationic starch | 4.0 |
| Xanthan gum | 0.7 |
| | 100 |

The article obtained had the following properties:

| | |
|---|---|
| Density | 300 kg/m³ |
| Flexural breaking modulus at 20° C. and 50% (RH) | 13 kg/cm³ |
| Compressive strength for 10% compression (20° C., 50% RH) | 2.7 kg/cm³ |
| Ignition weight loss, after 5 hours baking at 800° C. | 5% |
| Linear shrinkage in a block after 24 hours at 950° C. | 1.4% |
| Thermal conductivity at 800° C. (ASTM C-201) | 0.15 W/M. °K. |

EXAMPLE 3

The procedure of Example 2 was repeated, using the following composition:

| | |
|---|---|
| Alumina-silica ceramic fibers | 21.0 |
| Mineral wool (of the diabase type) | 31.8 |
| Kaolin (35% Al₂O₃) | 20.0 |
| Expanded perlite of density 80 g/l (mean size 300 microns) | 23.0 |
| Cationic starch | 3.5 |
| Xanthan gum | 0.7 |
| | 100 |

The formulation was employed to reinforce insulating refractory constructions capable of withstanding temperatures above 1,000° C.

The expanded perlite was added after the starch such as to avoid crushing the small perlite particles during stirring.

The final shaped article had the following properties:

| | |
|---|---|
| Density | 290 kg/m³ |
| Flexural breaking modulus at 20° C. and 50% (RH) | 11 kg/cm³ |
| Compressive strength for 10% compression (20° C., 50% RH) | 4.5 kg/cm³ |
| Ignition weight loss, after 5 hours baking at 800° C. | 5.5% |
| Linear shrinkage in a block after 24 hours at 800° C. | 0.8% |
| Thermal conductivity at 800° C. (ASTM C-201) | 0.14 W/M. °K. |

EXAMPLE 4

The formulation of Example 3 was improved by using vermiculite of a particle size on the order of one micron instead of the expanded perlite. The grade of exfoliated vermiculite used had a non-tamped density of 130 g/l and a mean diameter of about 400 microns. The shaped article produced had the following properties:

| | |
|---|---|
| Density | 300 kg/m³ |
| Linear shrinkage at 800° C. | 0.4% |
| at 1,000° C. | 0.8% |

EXAMPLE 5

The procedure of Example 2 was repeated, but using the following composition:

| | |
|---|---|
| Ceramic fibers | 13.0 |
| Mineral wool (of the Lapinus Rockwool type) | 36.0 |
| Kaolin (35% Al₂O₃) | 23.7 |
| Silica flour | 22.0 |
| Cationic starch | 4.5 |
| Xanthan gum | 0.8 |
| | 100.3 |

The final shaped article had the following properties:

| | |
|---|---|
| Density | 650 kg/m³ |
| Flexural breaking modulus at 20° C. and 50% (RH) | 55 kg/cm³ |
| Compressive strength for 10% compression (20° C., 50% RH) | 10 kg/cm³ |
| Ignition weight loss, after baking at 800° C. | 6.5% |
| Linear shrinkage at 800° C. | 0.5% |
| at 1,050° C. | 1.5% |
| Thermal conductivity at 100° C. (ASTM C-201) | 0.12 W/M. °K. |

The shaped article obtained after drying constituted a heat shield which, when it was subjected to a direct flame, did not disintegrate or crumble. It was resistant to thermal shock and could withstand temperatures above 1,050° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An insulating shaped article comprising an inorganic fiber matrix, said inorganic fiber matrix containing at least one inorganic filler material and a consolidating amount of a binder therefor which comprises admixture of a xanthan gum and a cationic starch.

2. The insulating shaped article as defined by claim 1, said inorganic fiber matrix comprising boron fibers, carbon fibers, glass fibers, ceramic fibers, wool fibers, or mixture thereof.

3. The insulating shaped article as defined by claim 1, said at least one inorganic filler material comprising a silica, an alumina, an aluminum silicate, kaolin, bentonite, wollastonite, magnesia, calcium carbonate, talc or zirconium oxide.

4. The insulating shaped article as defined by claim 3, said at least one inorganic filler material comprising bentonite or a colloidal silica.

5. The insulating shaped article as defined by claim 3, said at least one inorganic filler material further comprising expanded perlite or exfoliated vermiculite.

6. The insulating shaped article as defined by claim 1, comprising from 30% to 90% by weight of said inorganic fiber matrix.

7. The insulating shaped article as defined by claim 6, comprising from 40% to 85% by weight of said inorganic fiber matrix.

8. The insulating shaped article as defined by claim 1, comprising from 5% to 60% by weight of said at least one inorganic filler material.

9. The insulating shaped article as defined by claim 8, comprising from 20% to 50% by weight of said at least one inorganic filler material.

10. The insulating shaped article as defined by claim 1, comprising from 2% to 10% by weight of said binder.

11. The insulating shaped article as defined by claim 1, said inorganic fiber matrix further containing at least one flocculant.

12. The insulating shaped article as defined by claim 11, said at least flocculant comprising a synthetic anionic polymer and/or a quaternary ammonium compound.

13. The insulating shaped article as defined by claim 1, wherein the ratio by weight of said xanthan gum to said cationic starch ranges from ½ to 1/10.

14. The insulating shaped article as defined by claim 13, said ratio ranging from ¼ to ⅛.

15. The insulating shaped article as defined by claim 1, having a residual moisture content of less than 2%.

16. The insulating shaped article as defined by claim 15, having a residual moisture content of less than 1%.

17. The insulating shaped article as defined by claim 1, comprising an insulating plate, panel or molded article.

18. The insulating shaped article as defined by claim 1, heat-treated at a baking temperature.

19. The insulating shaped article as defined by claim 18, heat-treated at a baking temperature ranging from 300° to 1,600° C.

20. A process for the production of the insulating shaped article as defined by claim 1, comprising (a) intimately admixing, with water, a matrix-forming amount of inorganic fibers, said at least one inorganic filler material, said binder and, optionally, a flocculant, to formulate an aqueous slurry therefrom, (b) shaping the slurry thus formulated, and (c) drying said shaped slurry.

21. The process as defined by claim 20, comprising draining said slurry prior to the shaping thereof.

22. The process as defined by claim 20, said slurry having a solids content ranging from 1% to 10% by weight.

23. The process as defined by claim 22, said slurry having a solids content ranging from 4% to 6% by weight.

* * * * *